United States Patent [19]

Wilson et al.

[11] 4,053,961
[45] Oct. 18, 1977

[54] APPARATUS FOR HOLDING OPEN A DOOR OR THE LIKE

[76] Inventors: Murray Vincent Wilson, 20 Tyndalls Park Road, Bristol 8; Norman Henry Pearce, 111 Henbury Road, Westbury on Trym, Bristol, both of England

[21] Appl. No.: 655,382

[22] Filed: Feb. 5, 1976

[51] Int. Cl.² .............................................. E05F 5/00
[52] U.S. Cl. .................................. 16/84; 248/206 R; 16/DIG. 21; 292/DIG. 28
[58] Field of Search ...... 16/84, 86 R, 86 A, DIG. 21, 16/DIG. 17; 292/DIG. 28; 294/64; 248/206 R

[56] References Cited

U.S. PATENT DOCUMENTS

| 735,415 | 8/1903 | Schrodel | 292/DIG. 28 |
|---|---|---|---|
| 1,621,974 | 3/1927 | Deenihan | 16/84 |
| 2,015,622 | 9/1935 | Evulich | 16/86 A |
| 2,062,157 | 11/1936 | Benshimol | 248/206 |
| 2,319,727 | 5/1943 | Duggan | 248/206 |
| 2,652,585 | 9/1953 | Herbenar | 16/86 A |
| 3,042,958 | 7/1962 | Spears | 16/84 |
| 3,042,959 | 7/1962 | Strom | 16/86 A |

*Primary Examiner*—Andrew V. Kundrat
*Attorney, Agent, or Firm*—Young & Thompson

[57] ABSTRACT

Apparatus for holding open a door or similar closure member for a limited period, which may be predetermined, whereupon the door is automatically released and is able to return to its closed position, includes suction means for attachment to the door and/or surface against which the door is to be held in face-to-face relationship. The period of time during which the suction means is active may be determined by means of an air leakage to the suction means, or by means of a spring acting against the suction means.

3 Claims, 2 Drawing Figure

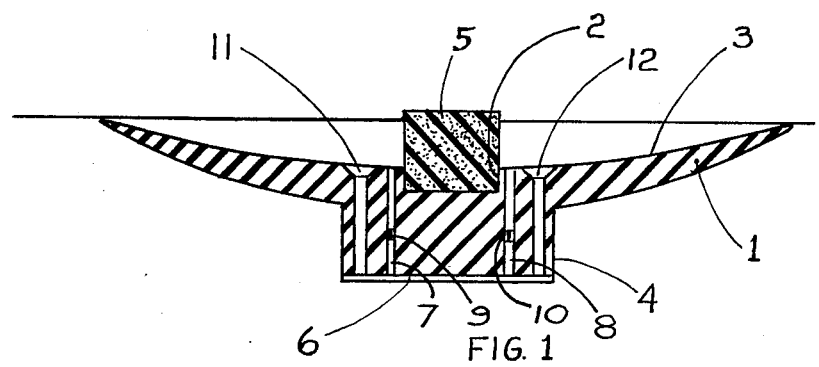
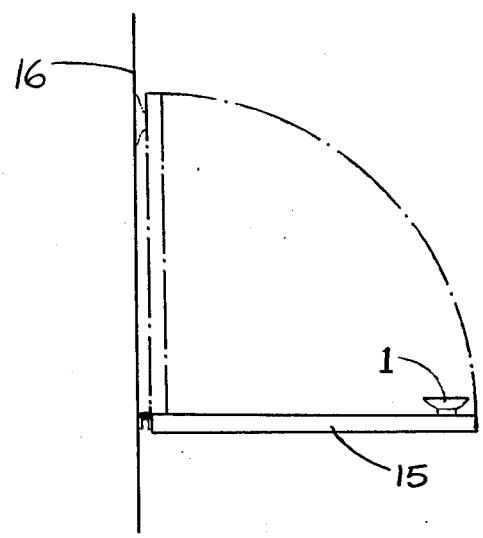

APPARATUS FOR HOLDING OPEN A DOOR OR THE LIKE

This invention relates to apparatus for holding open a door, or similar closure member, for a limited period which period may be perdetermined.

In buildings such as hospitals, offices, etc., where it is essential that fire or smoke doors are normally retained in a closed position, it is difficult to ensure that such doors remain in the closed position because of the passage of people, trolleys, stretchers, etc. It is often the practice to fit fire or smoke doors with mechanical latches so that a person pushing a trolley may secure a door in the open position before pushing the trolley through the doorway, and is not then inconvenienced by the door obstructing him or the trolley. The intention is that after moving through the doorway, the door latch should then be released so that the door may swing back to its closed position. However, it is often the case that, having once secured a door open, it is not then released and it remains open, and its intended purpose as a fire or smoke door is negated.

It is an object of the present invention to provide apparatus for holding open a door or similar closure member for a limited period which period may be predetermined, whereupon the door is automatically released and is able to return to its closed position. Such apparatus is able to retain a door or similar closure member in an open position in which position the door lies in face-to-face relationship with a surface such as a wall and includes suction means adapted for attachment to either the door or the said surface, or to both the door and the said surface, whereby, when the door is opened, the suction means retains it in the open position.

In one preferred form of the invention the suction means includes a suction pad which may be of natural rubber or synthetic elastomeric material. Air leakage means may be provided whereby a controlled flow of air may be directed to the area of suction of the said pad whereby the suction may be broken after a predetermined time. Preferably the means for providing the controlled flow of air comprises a passage extending through the suction pad between the suction surface of the pad and atmosphere, and valve means within the passage whereby the flow of air may be controlled. The means for controlling the flow of air to the area of suction may, however, be provided by passage means in the surface against which the door lies when in the open position. Additionally, or alternatively to the valve means, spring means such as a block of resilient material or a coil spring may be provided in the suction pad or on the surface with which the pad engages to break or assist in breaking the suction.

The surface against which a suction pad is pressed may be a wall, a door, or even another suction pad suitably mounted so as to retain the door in the open position.

The suction means may be provided by a piston and cylinder arrangement adapted to be attached to the door and the surface against which the door is to be opened.

The invention will now be described with reference to the accompanying drawings, of which FIG. 1 is a cross-section through a suction pad according to the invention, and FIG. 2 is a plan view of a door provided with a suction pad of the type shown in FIG. 1, the door being shown in the open and closed positions.

Referring to FIG. 1, a suction pad 1 of rubber is provided with a recess 2 in its suction surface 3 and a boss 4 in its reverse surface. A block 5 of sponge rubber is moulded into the recess 2 and a groove 6 extends across the rear surface of the boss. Between groove 6 and the surface 3 extend two holes 7 and 8, within each of which is positioned a plug 9 and 10 respectively, of brass, each plug having a bore of a predetermined diameter to allow air to leak between the groove 6 and the suction surface 3. If desired, the block 5 may be replaced by a coil spring one end of which is moulded into the recess 2.

Holes 11 and 12 extend through the boss in order that the suction pad may be screwed to the surface of a door, or to the wall against which the door is opened.

As shown in FIG. 2, a pad 1 of the type shown in FIG. 1 is attached to a door 15 which is normally spring biassed in a known manner to the closed position (indicated by the full line). When the door is moved into the opened position (indicated by the chain line) the suction surface of the pad is pressed against the surface of the adjoining wall 16 and the door is thus held in the open position. After a predetermined time, during which air leaks through the bores of the plugs 9, 10 the suction is broken and the door is caused to swing back to its closed position.

In another form of the invention, not shown, the holes 7 and 8 and plugs 9 and 10 are provided in the wall 16 and the suction pad is of solid construction, merely screwed to the wall by means of screws passing through the holes 11 and 12.

It will be understood that the invention is not limited to use with smoke or fire doors, and many variations may be made to the described embodiment without detracting from the spirit of the invention. For example, the block 5 of sponge rubber may be bonded into the recess 2 and not moulded therein and, in fact, it may be replaced by a coil spring or similar, or even omitted altogether. The material from which the suction pad is made may be of plastics such as flexible p.v.c. and the material from which the plugs 9, 10 are made need not be of metal, nor need they be bored: they may even be of porous material. A single suction pad may be used mounted either upon a door or a wall surface, or two such pads may be used, one mounted upon a door and the other upon the adjoining wall surface so that the two pads may co-operate with each other.

In some cases it may be found that no controlled leak of air through a suction pad is required, in which case the holes 7 and 8, and the plugs 9 and 10 may be omitted; such a case may be where the suction pads acts against a tiled surface where the grooves between adjacent tiles may provide the leakage path. The leakage path may of course be through the surface with which the pad co-operates.

The mounting of a pad to a door or surface of a wall may be by means of an adhesive or by any other convenient means.

In an alternative form of the invention, the suction means includes a piston and cylinder arrangement, the piston and cylinder being adapted to be mounted (respectively) on the door and the wall, so that movement of the piston within the cylinder creates the suction necessary to retain the door in the open position.

It will be appreciated that in whatever form the invention takes the door will in fact have a two rate movement of closing, the first rate occurring as the suction of the suction means is breaking down, and the second rate occurring after the breakdown of the suction.

What we claim is:

1. Apparatus for retaining a closure member in an open position in which position said member lies in face-to-face relationship with a fixed surface, comprising a suction pad adapted for attachment to one of said member and surface whereby when said member is opened, the suction pad retains it in an open position, said suction pad having air-leakage means to automatically break the suction between the pad and the other of said member and surface a predetermined time after the formation of said suction, the pad having a boss thereon for attachment to said one of said member and surface, said air-leakage means comprising a passageway extending through said boss, and a further passageway extending along the surface of said boss thereby to provide communication between the area of the suction and the atmosphere when the pad is secured to said one of said member and surface, said further passage comprising a groove along the surface of the boss that contacts said one of said member and surface.

2. Apparatus as claimed in claim 1, said air-leakage means including a valve.

3. Apparatus as claimed in claim 1, and spring means to assist the breaking of the suction.

* * * * *